(No Model.)
J. T. MEATS.
CARDING MACHINE.
No. 528,007. Patented Oct. 23, 1894.
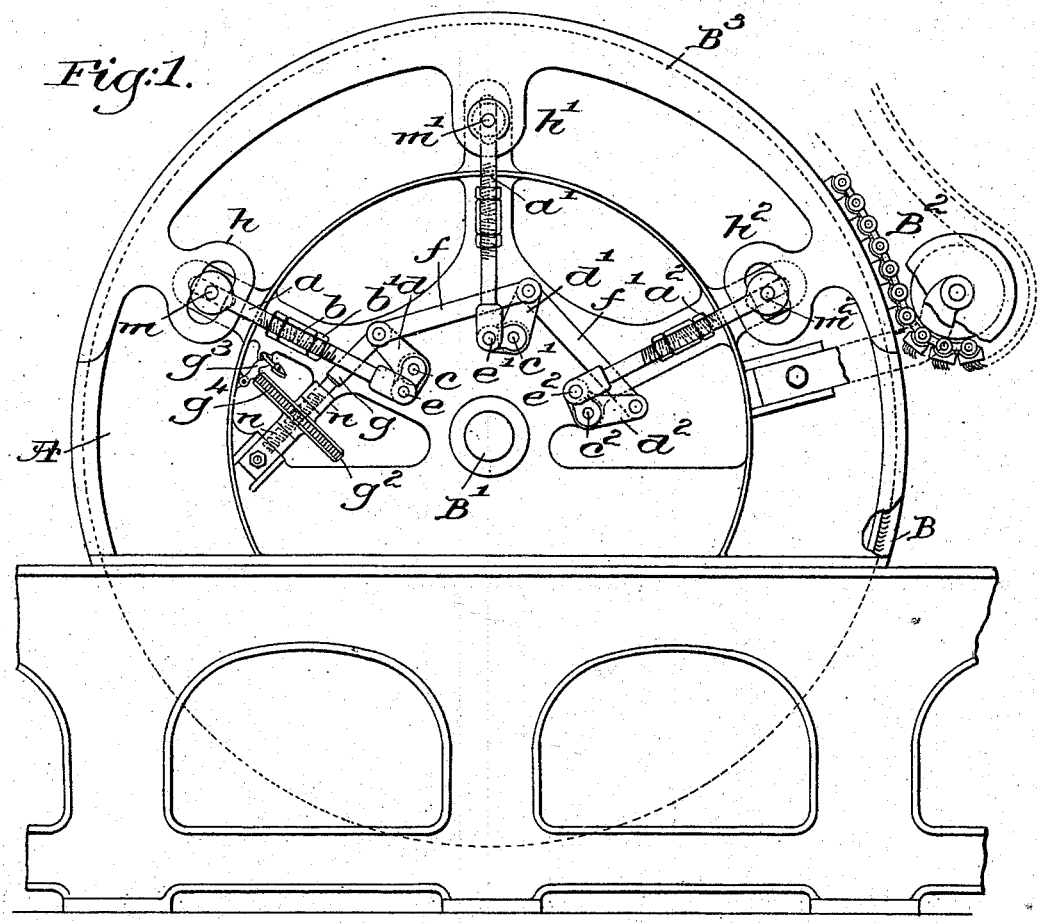
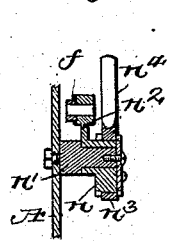
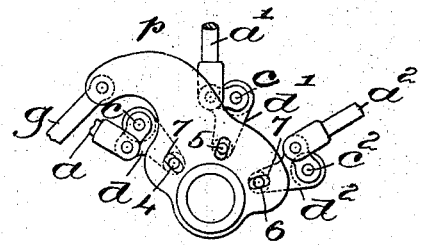
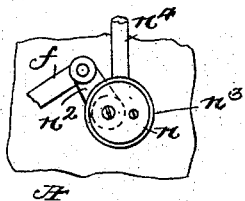
Witnesses.
Louis R. Gowell
Thomas J. Drummond.
Inventor:
John T. Meats.
by Crosby & Gregory
Atty's.

UNITED STATES PATENT OFFICE.

JOHN T. MEATS, OF TAUNTON, MASSACHUSETTS, ASSIGNOR TO THE MASON MACHINE WORKS, OF SAME PLACE.

CARDING-MACHINE.

SPECIFICATION forming part of Letters Patent No. 528,007, dated October 23, 1894.

Application filed August 24, 1893. Serial No. 483,895. (No model.)

*To all whom it may concern:*

Be it known that I, JOHN T. MEATS, of Taunton, county of Bristol, State of Massachusetts, have invented an Improvement in Carding-Machines, of which the following description, in connection with the accompanying drawings, is a specification, like letters and figures on the drawings representing like parts.

This invention has for its object to improve and simplify that class of carding machines employing traveling flats, my improvement relating more especially to mechanism for adjusting the so-called flexible bend or track upon which the top flats rest and travel in their movements.

In accordance with my invention the flexible bend has connected to it, at one or more points, rods attached to cranks or eccentrics, which may be adjusted to thereby impart longitudinal motion to the rods to cause the flexible bend to conform to the particular outline of the carding cylinder and its teeth, so that the teeth of the endless chain of flats will properly co-operate with the teeth of the carding cylinder.

Figure 1 in side elevation represents a sufficient portion of a carding machine with my improvements added to enable my invention to be understood. Fig. 2 is a detail of a modification of my invention to be described, and Figs. 3 and 4 show yet another modification.

Referring to the drawings, the arches or side frames A; the main cylinder B having a card clothed surface; the main shaft B'; the endless chain or belt of flats $B^2$; and the flexible bend $B^3$, the same being composed of a piece of metal substantially as shown in the drawings, are and may be all substantially as usual. This flexible bend, on which the flats of the endless chain travel, has to be adjusted from time to time to compensate for the wear of the teeth, both of the cylinder and of the flats, in grinding, and it also has to be adjusted to be of the same curve as the curve of the cylinder.

Prior to my invention the flexible bend for the toothed flats has been bent into the required curve, and has had connected with it independent and separately adjustable devices.

In the invention to be herein described, the rods, the flexible bend having been once adjusted to the proper curve in usual manner, may thereafter be all adjusted simultaneously or by a single operation to thus adapt the path to any change of position required due to grinding the teeth of the flats or of the cylinder.

The flexible bend $B^3$ has connected with it a series of adjustable rods $a, a', a^2$, each preferably composed of two pieces having right and left threads and joined by right and left threaded nuts, as $b$, suitable check nuts as $b'$ being employed to insure the retention of the rods and nuts in their adjusted position.

I have provided the frame-work of the machine with suitable pivots, as $c, c', c^2$, upon which I have mounted suitable cranks $d, d', d^2$, or it might be their equivalents, eccentrics, the said cranks having crank pins as $e, e', e^2$, over which are placed the inner ends of the rods $a, a', a^2$. The longer arms of these cranks are connected together by the links $f, f'$, they constituting crank connecting mechanism, while the crank $d$ has joined to it an adjusting device $g$, shown as a screw-threaded rod having upon it a revoluble nut $g'$, provided at its periphery with a series of teeth $g^2$ to co-operate with a locking device $g^3$, represented as a lever, which is secured in position preferably by a padlock $g^4$. The upper ends of the rods $a, a', a^2$, are adjustably connected with the ears $h, h', h^2$, of the flexible bend by suitable bolts $m, m', m^2$. The adjusting device $g$ is extended loosely through suitable bearings $n$, and when the locking device $g^3$ is disengaged from the nut $g^2$ on the adjusting device, the rotation of the nut on the screw will cause the movement in unison of the cranks referred to and also the rods $a, a', a^2$, connected therewith, so that all parts of the flexible bend may be adjusted uniformly to correspond with the change necessary in the path due to grinding of the teeth of the cylinder or of the cards.

I prefer to make the rods $a, a', a^2$, in two parts, as thereby I can in the first instance get finer adjustment, and especially I can get different adjustments of the different parts to thus establish the curve of the flexible bend in the first instance to the curve of the cylinder, for if the flexible bend $B^3$ exactly fitted externally to the contour of the cylinder then the rods referred to might be in a single piece. So this invention is not limited to the exact construction of the rods so long as they serve as intermediate devices between the flexible bend and the cranks or eccentrics which effect the adjustment of said flexible bend.

In Fig. 2 I have shown a modification of my invention wherein it may be supposed that the rod $g$ is a screw corresponding with that marked by the same letter in Fig. 1, and so also $a$, $a'$, $a^2$, may represent rods, and $d$, $d'$, $d^2$, cranks such as described in Fig. 1. In the modification, however, the crank pins 4, 5, 6, of the respective cranks enter like slots 7 in the plate $p$ which constitutes the connecting mechanism between the different cranks, the adjustment of the said plate through the screw rod $g$, as provided for in Fig. 1, causing the cranks to be turned about their centers $c$, $c'$, $c^2$, thus moving the rods $a$, $a'$, $a^2$, longitudinally in one or the other direction, that depending upon the direction of movement of the connection between the screw rod and the crank pin.

In the modification Figs. 3 and 4, instead of employing a crank, such as represented in Fig. 1, for moving the rods connected to the flexible bend, I have shown as a modification an eccentric $n$ mounted on a stud $n'$ instead of the frame-work, said eccentric having an arm $n^2$ to which is connected the link $f$, an eccentric strap $n^3$ surrounding the said eccentric being connected to the rod $n^4$, which rod, in practice, corresponds with the rod $a$, shown in Fig. 1, said rod being joined to the flexible bend.

By the term "crank" as used in the claims, I intend to include not only a crank of the character shown in Figs. 1 and 2, but also an eccentric.

Having described my invention, what I claim as new, and desire to secure by Letters Patent, is—

1. In a carding machine, a segmental flexible bend, a series of cranks, and rods to join the same with said flexible bend, combined with connecting mechanism between said cranks or their described equivalents to insure the simultaneous movement thereof, substantially as described.

2. In a carding machine, a segmental flexible bend, a series of cranks, and rods to join the same with the said flexible bend, combined with connecting mechanism between said cranks or their described equivalents, and with an adjusting device to move said connecting mechanism and simultaneously move the said cranks or their described equivalents, substantially as described.

3. In a carding machine, a segmental flexible bend, a series of cranks, intermediate connecting devices and rods to join them to said flexible bend, combined with adjusting devices to move said connecting mechanism, and with locking mechanism to lock said parts in their adjusted position, substantially as described.

In testimony whereof I have signed my name to this specification in the presence of two subscribing witnesses.

JOHN T. MEATS.

Witnesses:
HARRY W. FAY,
EDWARD G. HALL.